Figure 1:
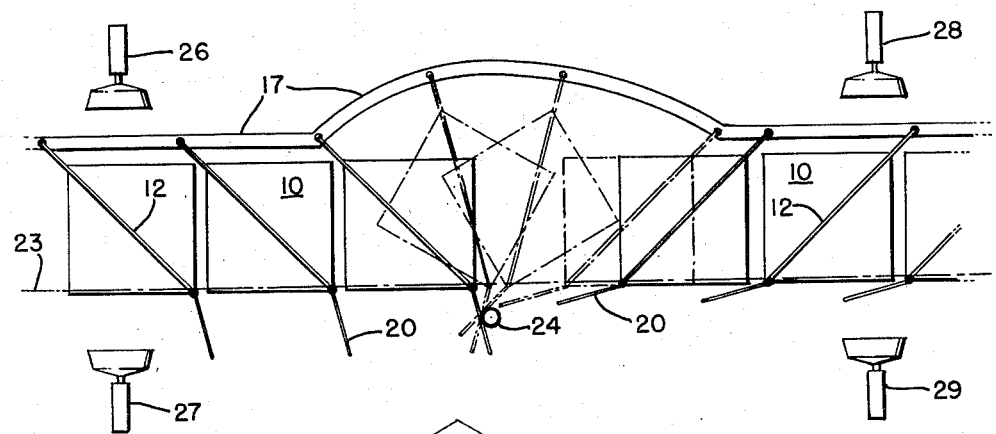

Aug. 13, 1957     R. C. JUVINALL     2,802,561
APPARATUS FOR INDEXING ARTICLES
Filed Aug. 18, 1952

INVENTOR.
ROBERT C. JUVINALL
BY
*Harry E. Downer*
Attorney

United States Patent Office 2,802,561
Patented Aug. 13, 1957

2,802,561

APPARATUS FOR INDEXING ARTICLES

Robert C. Juvinall, Indianapolis, Ind., assignor to Ransburg Electro-Coating Corp., Indianapolis, Ind., a corporation of Indiana Application August 18, 1952, Serial No. 305,030

2 Claims. (Cl. 198—33)

This invention relates to apparatus for indexing articles carried on a moving conveyor and is particularly directed to automatic mechanism for positioning or turning a succession of articles being carried along a moving conveyor.

Article conveying apparatus is widely used in industry for transporting a series of articles over a predetermined path for the successive processing of the articles at a number of stations spaced along the path. In connection with spray coating and various other types of processing, it is frequently desired to "bunch" articles being carried on a conveyor so that there is a very small spacing between adjacent articles. For example, in the spray coating of relatively large articles such as automatic washing machine cabinets and the like, it is frequently desirable that the articles move through a spray coating zone with close spacing between adjacent articles to minimize waste of coating material which might otherwise be projected between widely spaced articles and also to obtain a more uniform coating by presenting the articles in an arrangement which approximates a continuous flat sheet of material.

In processing objects having a polygonal cross section in plan view, it is often desired to index or rotate the articles through an arc or angle which may be more or less than 90° so that all sides of the articles may be processed. By virtue of such indexing first one pair and then another pair of oppositely disposed sides of certain polygonal articles can be presented parallel to the path of article movement for convenient processing such as, for example, spray coating. It is apparent that an attempt to rotate closely spaced polygonal articles about their centers while their adjacent sides were parallel to each other would result in undesirable bumping or other interference between adjacent sides of the articles. In the case of articles which present a square in plan view and whose opposite sides lie approximately parallel to the article path, indexing of the articles about their centers would not be possible without inter-article contact where the distance between articles was less than approximately .207 times the article width.

The object of this invention is to provide a method and means for indexing articles moving on a conveyor with close spacing between successive articles. A further object of this invention is to provide means for indexing a succession of square articles moving on a conveyor with opposite sides parallel to the article path with a spacing between articles less than approximately .207 times the article width. Still another object of this invention is to provide means for indexing closely spaced polygonal articles while moving the articles on a conveyor in seriatim with their adjacent-most sides approximately parallel. Yet another object of the invention is to provide a simple and economical means for indexing a succession of articles traveling on a conveyor. One further object of this invention is to provide an improved article supporting mechanism for articles being carried along a conveyor.

In order to accomplish the foregoing and other objects of my invention, I prefer to use a novel article supporting structure and indexing device which will pivot or index successive articles about a vertical axis substantially coincident with a leading edge of the article or a vertical axis intersecting a line which is an extension of a line drawn from the center to a corner of the article. When indexing takes place about such a vertical axis it is apparent that the articles may be intimately spaced, leaving only such distance between successive articles as may be desired to prevent inter-article contact as the articles move normally along the conveyor track.

Figure 2:
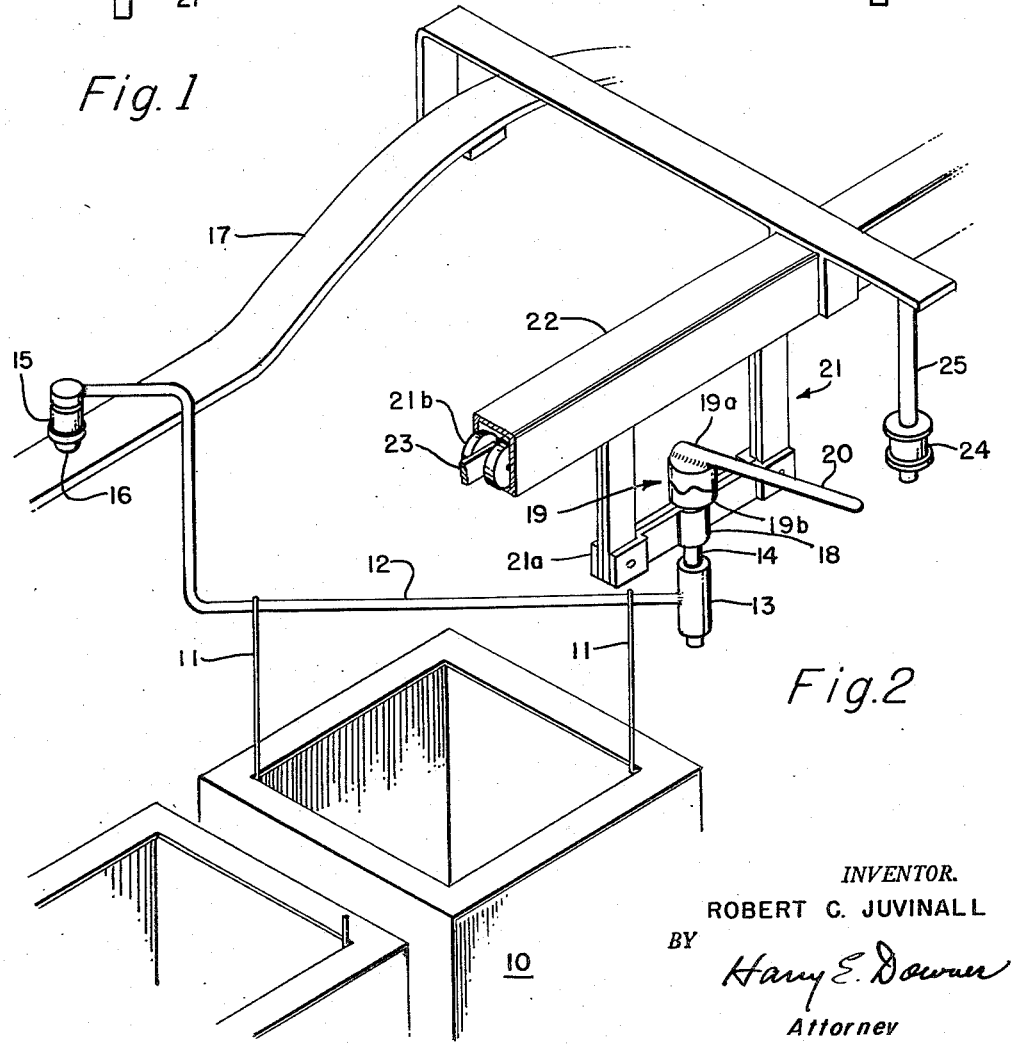

The detailed method of accomplishing my invention will now be set forth with reference to the accompanying drawings wherein:

Fig. 1 is a diagrammatic view of an embodiment of my invention being used in the spray coating of articles; and Fig. 2 is an isometric view, somewhat broken away, showing the detailed construction of one embodiment of my invention.

Referring to Figs. 1 and 2, a series of articles 10 are moved wtih a uniform close spacing between successive articles. While my invention is adapted for indexing any articles, in the embodiment to be described the articles are automatic washing machine cabinets which are square shaped in plan view. The articles are suspended from two article hangers 11 which in turn are supported from the lower horizontal segment of a pivot arm 12. Pivot arm 12 is rigidly connected at its lower end to a sleeve 13 which is firmly connected as by set screws to a downwardly extending vertical shaft 14. The other or upper end of arm 12 is supported on a bracket 15 which houses a free-rolling ball 16 which rides on the upper face of an auxiliary track 17.

Shaft 14 is rotatably journaled within a bearing 18 which is positioned so that its axis is a vertical extension of a leading edge of article 10. To the upper end of shaft 14 is rigidly and concentrically mounted the upper member 19a of positioning cam 19. The lower member 19b of cam 19 is mounted on the upper face of bearing 18. An arm 20 extends horizontally outward from member 19a transverse to and away from the path of the articles. Bearing 18 is rigidly mounted upon the horizontal lower segment 21a of a trolley 21, which is one of a series of similar trolleys mounted on a track 22. Trolley 21 is guided along the conveyor path by a series of rollers 21b which ride along the lower flanges of conveyor track 22. Trolley 21 is propelled along the track 22 by connection of the trolley to a flexible cable 23 which is propelled along track 22 in the direction of article movement from a suitable source of power (not shown).

A suitable abutment such as a cam wheel 24 rotatably mounted about a shaft 25 is positioned to one side of the article path so that arm 20 will strike cam wheel 24 as trolley 21 is moved adjacent shaft 25. At this point auxiliary track 17 is positioned outwardly from track 22 in an arc generally about shaft 25 so as to provide a continuous support path for ball 16 as the articles are indexed about an axis coincident with shaft 14. In the embodiment shown in Fig. 1 the four sides of the square articles are spray coated; two opposite sides first being spray coated by electrostatic spray heads 26 and 27 prior to indexing and then the two other sides coated by spray heads 28 and 29 subsequent to indexing.

In the operation of the apparatus a series of closely spaced articles 10 are moved in succession, each supported from two article hangers 11 and a pivot arm 12, along parallel conveyor tracks 22 and 17. As each article passes in coating relation with electrostatic spray heads 26 and 27, the two outwardly facing sides of the article will be uniformly spray coated. The article will then move forward on tracks 17 and 22 until arm 20 strikes cam wheel 24. As cable 23 imparts a constant forward motion to trolley 21 and hence to bearing 18, the forward motion of the leading edge of article 10, which is positioned substantially below bearing 18, will continue. This forward motion will transmit a turning movement to arm 20 resting against cam wheel 24 which will cause shaft 14 to pivot within bearing 18, thus causing arm 12 to swing forwardly so that ball 16 will roll in an arc along track 17 and cause article 10 to turn 90° about its leading edge lying generally beneath bearing 18. As the 90° turning is completed, the article will be held in its new position by positioning cam 19.

The turning motion of arm 20 will permit it to slip along the face of cam wheel 24 until, as trolley 21 continues its forward motion, arm 20 no longer will be engaged by cam wheel 24. Since the article immediately ahead of the article being indexed has already been indexed a full 90°, it is apparent that its prior indexing has projected it so far ahead of the trailing article that there can be no inter-article contact with the prior-indexed article as a result of the indexing of the latter article. After indexing the article will then move along tracks 17 and 24 and into coating cooperation with electrostatic spray heads 28 and 29 where the two remaining sides of the article may be coated.

The apparatus and method just described permits the indexing of square objects on centers spaced virtually as close as the width of the article itself. The apparatus may also be used on rectangular or other polygonal shaped articles which are closely spaced and whose adjacent-most sides are generally parallel, but in such cases the center-to-center spacing of the articles must be slightly greater than the length of the longest side of the article. In all cases the apparatus permits indexing of articles at a much closer spacing than would be possible in the conventional indexing about their centers of a series of polygonal-shaped articles.

While my invention is capable of various embodiments and may be used for articles of any shape, there has been shown in the drawings and described in detail one specific embodiment with the understanding that the detailed description is of one exemplification of the invention and as such it is not intended to restrict the invention to the particular embodiment shown. The scope of my invention is to be limited only by the following claims.

I claim:

1. Article conveying and indexing apparatus, comprising a trolley, an article support pivotally mounted on said trolley for swinging movement about a vertical axis, means including a conveyor track for supporting and moving said trolley so that said vertical axis of said support moves along a predetermined substantially rectilinear path, said support being arranged and constructed to support said article substantially entirely on one side of said path, a second conveyor track, said article support comprising a horizontally extending member supported at its terminus opposite its vertical axis by said second conveyor track, an arm rigid with said support and projecting therefrom to the opposite side of said path, and an abutment positioned to be engaged by said arm and to rotate said support and the article thereon through a predetermined angle as the associated trolley moves past the abutment.

2. Apparatus for conveying and indexing a plurality of articles each having first and second vertical side surfaces respectively located generally in planes forming a dihedral angle, comprising a conveyor, a plurality of article supports mounted on said conveyor in spaced relation for rotation respectively about parallel vertical axes, said supports being constructed and arranged to support the article with the apex of the dihedral angle of each article substantially coincident with the axis of its associated support and with the first side surfaces of the articles extending rearwardly from their respective support-axes substantially in a common plane parallel to the path of conveyor movement, and means operating on each support as it passes a predetermined point on the conveyor for rotating the support forwardly to bring the second side surface of the associated article into said common plane.

References Cited in the file of this patent
UNITED STATES PATENTS

| | | |
|---|---|---|
| 1,891,195 | Titus | Dec. 13, 1932 |
| 2,279,686 | Kerlin | Apr. 14, 1942 |
| 2,546,374 | Rayburn et al. | Mar. 27, 1951 |